United States Patent
Morinaga et al.

(10) Patent No.: US 6,785,263 B1
(45) Date of Patent: Aug. 31, 2004

(54) COMMUNICATION CONTROL METHOD IN COMPLEX SWITCHED NETWORK AND GATEWAY USING THE METHOD

(75) Inventors: Masanobu Morinaga, Kawasaki (JP); Noriyuki Fukuyama, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/447,659

(22) Filed: Nov. 23, 1999

(30) Foreign Application Priority Data

Jan. 20, 1999 (JP) .......................................... 11-011433

(51) Int. Cl.⁷ .............................................. H04L 12/66
(52) U.S. Cl. ...................... 370/352; 370/356; 370/401
(58) Field of Search ................................ 370/351, 352, 370/353, 354, 355, 356, 357, 360, 381, 382, 383, 384, 428, 462, 463, 401, 465, 466; 379/220.01, 221.01, 221.14; 709/218, 227, 228

(56) References Cited

U.S. PATENT DOCUMENTS

| | | | | |
|---|---|---|---|---|
| 6,157,648 A | * | 12/2000 | Voit et al. | .................... 370/401 |
| 6,226,287 B1 | * | 5/2001 | Brady | ......................... 370/352 |
| 6,307,853 B1 | * | 10/2001 | Storch et al. | ................ 370/354 |
| 6,347,085 B2 | * | 2/2002 | Kelly | ........................... 370/352 |
| 6,445,697 B1 | * | 9/2002 | Fenton | ........................ 370/357 |
| 6,449,259 B1 | * | 9/2002 | Allain et al. | ................. 370/253 |

FOREIGN PATENT DOCUMENTS

| | | |
|---|---|---|
| JP | 9-233129 | 9/1997 |
| JP | 9-261275 | 10/1997 |
| JP | 10-173696 | 6/1998 |

* cited by examiner

Primary Examiner—Huy D. Vu
Assistant Examiner—Thomas E. Volper
(74) Attorney, Agent, or Firm—Staas & Halsey LLP

(57) ABSTRACT

Each of gateways GW1, GW2 includes packet-switched network control portions 32, 33 connected to packet-switched networks, a circuit switched network control portion 35 connected to a circuit switched network, and a call control portion 31 for controlling a communication call together with the packet-switched network control portions and the circuit switched network control portion and for monitoring the traffic of the packet-switched network. The packet-switched network control portion includes plural circuit connection portions 37, 38 which can be connected to plural circuits, plural CODECs 34 having different compression ratios for enabling real-time type data transmission, and a storage data processing portion 32 for enabling store-and-forward type data transmission.

9 Claims, 9 Drawing Sheets

COMMUNICATION CONTROL METHOD IN COMPLEX SWITCHED NETWORK AND GATEWAY USING THE METHOD

BACKGROUND OF THE INVENTION

1. Field of the Invention

The present invention relates to a communication control method for performing data communication between terminals in a complex switched network including a packet-switched network and a telephone network, and relates to a gateway using the control method. In this complex switched network, a communication system called Internet Telephony has become in practical use rapidly.

2. Description of the Prior Art

In recent years, high speed communication of voice data among personal computers on plural local area networks has been possible and practical as the development of network technology including wide band for the local area network (LAN), and the development of computer technology including multifunction of a personal computer (PC) and high speed of microprocessor. Application software and system for performing voice communication using conventional telephones among personal computers on the Internet including the LAN and a wide area network (WAN) are rapidly being available in the market. This kind of communication system is called the "Internet Telephony."

In addition, an Internet telephony gateway (simply referred to as a gateway) has been developed, which has gateway function of protocol conversion between the telephone network and the Internet so as to realize communication therebetween. Furthermore, a communication system that uses the Internet telephony gateway for relaying the exchanges of the conventional telephone network by the Internet has been proposed and in practical use.

This communication system relaying the exchanges by the Internet is called bypass call between PBX (or route call between PBX) by the Internet Telephony. This telephone communication utilizing the bypass call between PBX by the Internet Telephony can be realized at lower cost than the telephone communication using the conventional telephone network, so this bypass call between PBX communication system is rapidly being used widely.

However, the above-mentioned bypass call between PBX communication system using the Internet telephony gateway has a disadvantage in communication quality such as sound quality compared with the conventional telephone network.

First, when sending and receiving data from and to the gateway on the Internet in the bypass call between PBX communication system, the communication data is compressed by a sound compression module (hereinafter, referred to as a CODEC), so that real-time communication can be performed. Therefore, the sound quality depends on the compression ratio of the CODEC. If the CODEC having large compression ratio is used, communication with low transmission speed can be possible though the sound quality is low. On the other hand, the CODEC having small compression ratio can realize good sound quality though high transmission speed is required. Thus, the sound quality and the transmission speed have relationship of tradeoff with each other.

Furthermore, there is a method in facsimile communication that does not need real-time communication, in which the calling side converts facsimile data into an e-mail format before sending it. Especially, when the quality of the Internet between the gateways is not high enough for the real-time processing, the method of converting facsimile data into an e-mail format before sending it is effective.

The above-mentioned method of transmission in real-time utilizing data compression by CODEC is called a "real-time transmission," while the method of transmission after converting data into an e-mail format is called a "store-and-forward transmission."

The communication method between the gateways has many varieties of combination by selecting the circuit of gateway used for the bypass call between PBX, by selecting the real-time transmission or the store-and-forward transmission, and by selecting the CODEC (the compression ratio) used for the store-and-forward transmission.

Conventionally, the above-mentioned combination (i.e., the transmission method) is fixed for the bypass call between PBX communication system, and the user could not select the combination.

SUMMARY OF THE INVENTION

The object of the present invention is to provide the Internet telephony gateway that enables a user to select the transmission method for performing communication suitable for the situation unique to the user, and can select the efficient transmission method automatically if the user did not select the transmission method.

The communication control method in the complex switched network according to the present invention is applied to a complex switched network including a packet-switched network, a circuit switched network and a gateway that is connected to the packet-switched network and the circuit switched network via at least one circuit. The method includes the step in which the gateway selects one of plural data communication methods in accordance with a parameter input to the gateway or a circuit exchange. According to this communication control method, more effective communication method such as a communication path or a transmission format can be selected in the Internet telephony gateway system.

The selection of the data communication method includes selecting one of plural circuits to be used, selecting one of plural data compression means (CODEC) having different compression ratios, and selecting a data transmission format that is either the store-and-forward transmission or the real-time transmission.

Furthermore, the parameter used for selecting (switching) the communication method can be, for example, a dial number that is input to a telephone-equivalent terminal connected to the gateway or the circuit exchange, a user information of the calling side, a user information of the incoming side, a traffic of a packet-switched network that is measured in the gateway, or transmission contents that are sent for communication.

If the dial number that is input is used as the parameter, the user can select any communication path, transmission format or others by inputting a dial number for specifying the party to call. For example, the user can select the communication path or the transmission format having higher quality of service (QoS) if necessary.

The user information of the calling side, i.e., the user information of the caller can be input by an ISDN telephone or the equivalent as specifying the party to call. Using the user information of the calling side as the parameter, the communication path or the transmission format having higher QoS can be selected in accordance with the title of the caller, for example.

The user information of the incoming side, i.e., the user information of the receiver is transmitted from the incoming side to the calling side upon the incoming call. Using the user information of the incoming side as the parameter, the communication path or the transmission format having higher QoS can be selected in accordance with the title of the receiver, for example.

If the traffic of the packet-switched network measured in the gateway is used as the parameter, the gateway can select an efficient communication method automatically even in the case where the user did not select the communication method. Namely, the gateway can select the communication path, the transmission format or others having higher QoS in accordance with the traffic of the packet-switched network. For example, the circuit whose band used ratio as the traffic is low is selected, and the CODEC having higher compression ratio is selected if the band used ratio is not sufficiently low.

The transmission contents that are transmitted on communication has communication types, i.e., sound or facsimile, for example. If the transmission contents can be judged at an early stage of the communication, it can be used as the parameter for selecting (resetting) the transmission method, so that the communication method more suitable to the transmission contents can be selected automatically.

The gateway of the present invention that enables the above-mentioned communication control method includes a packet-switched network control portion connected to the packet-switched network, a circuit switched network control portion connected to the circuit switched network, and a call control portion for controlling a call of communication together with the packet-switched network control portion and the circuit switched network control portion, and for monitoring traffic of the packet-switched network, wherein the packet-switched network control portion includes a plurality of circuit connection portion that can be connected to plural circuits, and one of the plural circuits is selected as the circuit to be used in accordance with a parameter that is input to the gateway.

In a second configuration of the gateway of the present invention, the packet-switched network control portion includes plural data compression means having different compression ratios, and one of the plural data compression means is selected as the data compression means to be used in accordance with a parameter that is input to the gateway.

In a third configuration of the gateway of the present invention, the packet-switched network control portion includes a storage data processing portion for enabling store-and-forward type data transmission, and a data compression means for enabling real-time type data transmission, wherein either the store-and-forward type data transmission or the real-time type data transmission is selected in accordance with a parameter that is input to the gateway.

DESCRIPTION OF THE PREFERRED EMBODIMENTS

Hereinafter, the present invention will be explained more in detail with reference to embodiments and drawings.

Figure 1:
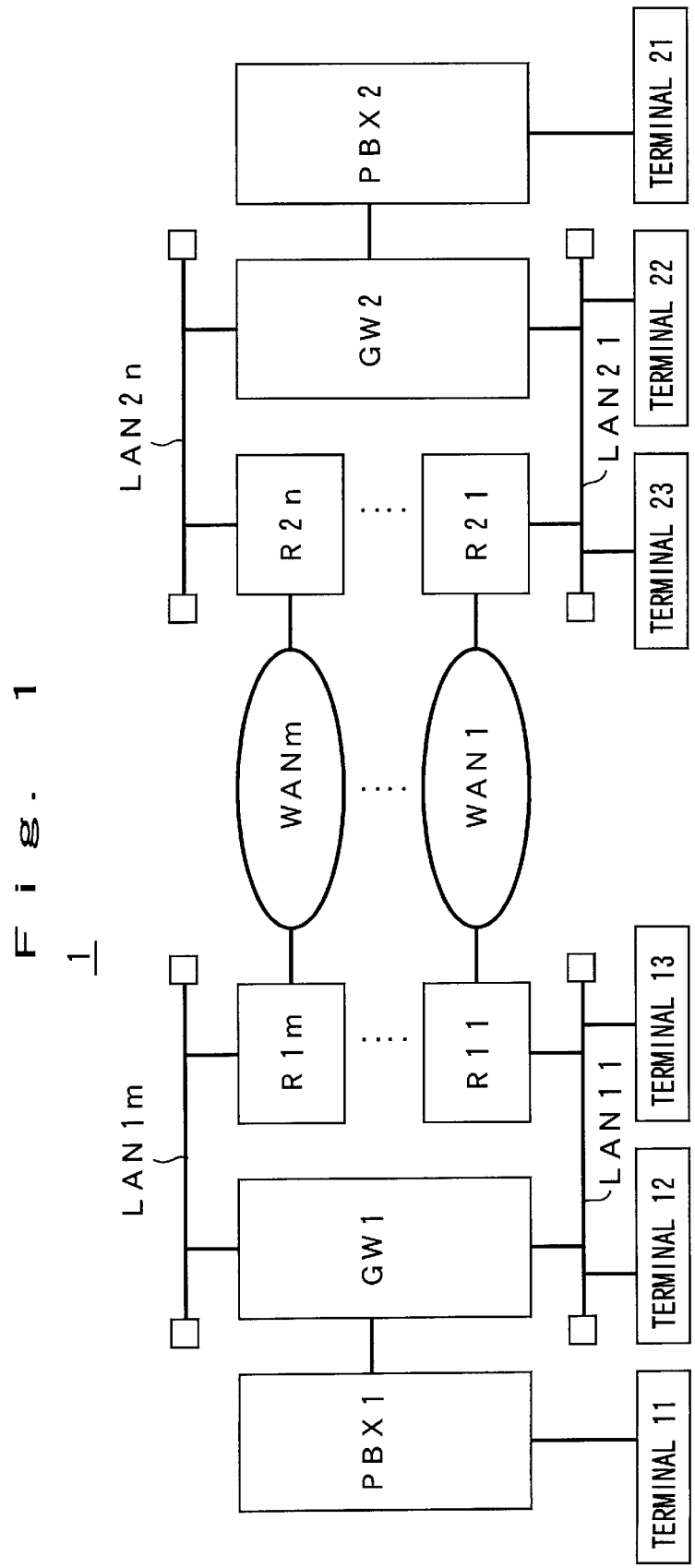
FIG. 1 is a block diagram showing an example of the basic configuration of the complex switched network system according to an embodiment of the present invention.

FIG. 1 shows an example of the basic configuration of the complex switched network system to which the communication control method and the gateway of the present invention can be applied. This complex switched network system includes wide area networks WAN1–WANm as packet-switched networks, local area networks LAN11–LAN1m, LAN21–LAN2n, telephone-equivalent terminals 11–13, 21–23, circuit exchanges PBX1, PBX2, Internet telephony gateways GW1, GW2. The telephone-equivalent terminals (hereinafter, simply referred to as the terminal) 12, 13, 22, 23, include a telephone machine as well as a telephone and facsimile machine or a computer terminal.

In FIG. 1, the terminal 11 is connected to the Internet telephony gateway (hereinafter, simply referred to as the gateway) GW1 via the circuit exchange PBX1, while the terminals 12, 13 are connected to the gateway GW1 directly by the local area network LAN11. The local area network LAN11 is connected to the wide area network WAN1 by the Internet via a router R11. The circuit exchange PBX1 and the gateway GW1 are connected to each other via a central office line (ISDN circuit), while the gateway GW1 and the router R11 communicate with each other using the Internet protocol (IP).

Thus, one node of the bypass call between PBX communication system is constituted using the gateway GW1. The other node is arranged on the opposite side (the right side in FIG. 1) with respect to the wide area network WAN1. In the same way as the above-mentioned node, a local area network LAN2 is connected to the wide area network WAN1 via a router R21, and the terminals 22, 23 and the gateway GW2 are connected to the local area network LAN2. The terminal 21 is connected to the gateway GW2 via the circuit exchange PBX2.

The bypass call between PBX communication systems having the same configuration exist in number 1–m in FIG. 1. Namely, one gateway GW1 is connected to m local area networks LAN11–LAN1m, and the other gateway GW2 is connected to n local area networks LAN11–LAN1n. Both local area networks LAN1i and LAN2i are connected to each other via their routers R1i, R2i and the wide area network WANi (i=1–m).

In the example shown in FIG. 1, the terminals 11, 21 are telephones, while the terminals 12, 13, 22 and 23 are network equipment such as personal computers. The personal computers 12, 13, 22 and 23 can perform voice communication using an extension function of software or other means. However, the communication control method of the present invention can be applied to a system including at least two terminals. For example, if the terminal 11 is connected to the gateway GW1 via the circuit exchange PBX1, and the terminal 21 is connected to the gateway GW2 via the circuit exchange PBX2, the communication control method of the present invention can be applied without the terminals 12, 13, 22 and 23.

In addition, the communication control method of the present invention can be applied if there is at least one path of the bypass call between PBX communication system including the local area networks LAN1i and LAN2i, the routers R1i and R2i, and the wide area network WANi. Furthermore, if each node is connected to the wide area network not via a router, but directly by the local area network, the communication control method of the present invention can be applied.

The gateways GW1 and GW2 use the H.323 protocol of Telecommunication Standardization Conference of International Telecommunications Union (ITU-T) so as to perform the real-time type communication, and use the Simple Mail Transfer Protocol (SMTP) that is the e-mail transfer protocol used in the Internet so as to perform the store-and-forward type communication.

Figure 2:
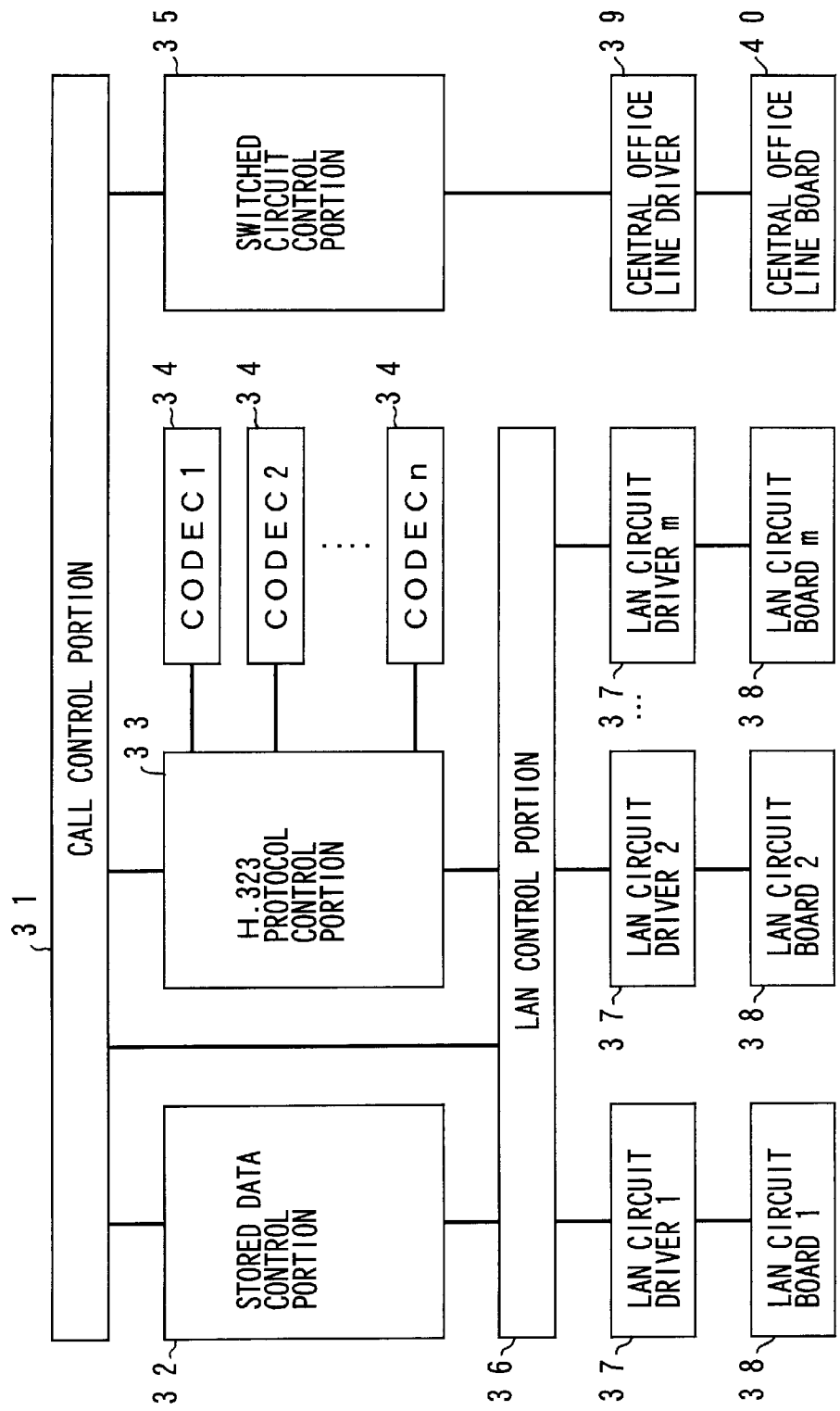
FIG. 2 is a block diagram showing a module configuration of the gateway according to an embodiment of the present invention.

FIG. 2 shows a module configuration of the gateway GW1 (or GW2). The gateway GW1 (GW2) includes a call control portion 31, a stored data control portion 32, an H.323 protocol control portion 33, a plurality of CODECs 34, a switched circuit control portion 35, a LAN control portion 36, a plurality of LAN circuit drivers 37 and LAN circuit boards 38, a central office line driver 39 and a central office line board 40.

The central office line board 40 is connected to a central office line interface of the circuit exchange PBX1 shown in FIG. 1 via the central office line. The central office line board 40 is controlled by the central office line driver 39, and the signal that the central office line driver 39 transmits to or receives from the circuit exchange PBX1 via the central office line is processed by the switched circuit control portion 35.

The LAN circuit driver 37 and the LAN circuit board 38 are arranged in m pairs for the gateway GW1 and in n pairs for the gateway GW2. Each of the LAN circuit boards 38 is connected to the corresponding local area network (packet-switched network) LAN1i or LAN2i. The signal that each of the LAN circuit drivers 37 transmits to or receives from the local area network via the LAN circuit board 38 is processed by the LAN control portion 36.

Each of the plural CODECs (CODEC1–CODECn) 34 is a real-time compressor and decompressor of communication data, and has unique compression ratio different from the other. The H.323 protocol control portion 33 controls the protocol of the real-time type communication using the CODEC 34. The stored data control portion 32 controls the protocol of the store-and-forward type communication using the SMTP.

The call control portion 31 takes charge of communication call together with the switched circuit control portion 35, the H.323 protocol control portion 33 and the stored data control portion 32. The call control portion 31 also monitors the traffic of the network together with the LAN control portion. The call control portion 31 sets the data communication method in accordance with the target parameter setting table shown in Table 1.

TABLE 1

PARAMETER SETTING TABLE

| Calling No. | User Information of the Calling Side | User Information of the Incoming Side | Traffic | Communication Contents |
|---|---|---|---|---|
| ON | OFF | OFF | OFF | OFF |

The target parameter setting table of TABLE 1 shows an example of the table that is looked up for deciding the target parameter used for changing the communication method. The table includes parameters of a calling number, a user information of the calling side, a user information of the incoming side, traffic and communication contents, and ON or OFF flag for each parameter. Only one parameter (the calling number in TABLE 1) is accompanied by ON flag, and the data communication method is set in accordance with the parameter accompanied by ON flag.

TABLE 2 shows an example of the communication method setting table used for setting a specific communication method when deciding the data communication method.

TABLE 2

COMMUNICATION METHOD SETTING TABLE

| Circuit | CODEC | Transmission Format |
|---|---|---|
| ON | OFF | OFF |

The communication method setting table of TABLE 2 includes items of a circuit to be used, a CODEC to be used and a transmission format to be used, and ON or OFF flag for each item. Only one item (the circuit in TABLE 2) is accompanied by ON flag, and is selected as a specific communication method.

TABLE 3 is a reference table of the calling number and communication method, which is looked up when the calling number is accompanied by ON flag in the target parameter setting table of TABLE 1. This table is an example of a database used for controlling the relationship between the calling number (telephone number) and setting of the specific communication method.

TABLE 3

REFERENCE TABLE OF CALLING NUMBER AND COMMUNICATION METHOD

| Calling No. | Transmission Format | Circuit | CODEC |
|---|---|---|---|
| 1100 | Real Time | LAN11 | CODEC1 |
| 1101 | Store and Forward | — | — |
| ...... | ...... | ...... | ...... |
| 1112 | Real Time | LAN12 | CODEC2 |
| Default | Real Time | LAN12 | CODEC1 |

The reference table of the calling number and communication method of TABLE 3 includes items of the calling number, the transmission format to be used, the circuit to be used and the CODEC to be used, and shows the relationship among the items. A telephone number for specifying the party to be called is registered as the calling number. A transmission format (the real-time type or the store-and-forward type) to be used in accordance with each calling number is registered as the transmission format. A LAN circuit to be used in accordance with each calling number is registered as the circuit. A CODEC (or the compression ratio) to be used in accordance with each calling number is registered as the CODEC. If the calling number is accompanied by ON flag in the target parameter setting table of TABLE 1, the reference table of the calling number and communication method of TABLE 3 is looked up, so that the transmission format, the circuit and the CODEC to be used as the communication method are decided.

TABLE 4 is a reference table of the user information of the calling side and the communication method that is looked up when the user information of the calling side is accompanied by ON flag in the target parameter setting table of TABLE 1. TABLE 4 is an example of a database for controlling the relationship between the user information of the calling side (e.g., the telephone number of the calling side) and setting of the specific communication method.

TABLE 4

REFERENCE TABLE OF USER INFORMATION OF
THE CALLING SIDE AND COMMUNICATION METHOD

| User Information of Calling Side | Transmission Format | Circuit | CODEC |
|---|---|---|---|
| 8800 | Real Time | LAN11 | CODEC1 |
| 8801 | Store and Forward | — | — |
| ... ... | ... ... | ... ... | ... ... |
| 8812 | Real Time | LAN12 | CODEC2 |
| Default | Real Time | LAN12 | CODEC1 |

The reference table of the user information of the calling side and the communication method of TABLE 4 includes items of the user information of the calling side, the transmission format to be used, the circuit to be used and the CODEC to be used, and shows the relationship among the items. A telephone number of the calling side that is used when calling is registered as the user information of the calling side, for example. A transmission format (the real-time type or the store-and-forward type) to be used in accordance with each user information of the calling side is registered as the transmission format. A LAN circuit to be used in accordance with each user information of the calling side is registered as the circuit. A CODEC (or the compression ratio) to be used in accordance with each user information of the calling side is registered as the CODEC. If the user information of the calling side is accompanied by ON flag in the target parameter setting table of TABLE 1, the reference table of the user information of the calling side and communication method of TABLE 4 is looked up, so that the transmission format, the circuit and the CODEC to be used as the communication method are decided.

TABLE 5 is a reference table of the user information of the incoming side and the communication method that is looked up when the user information of the incoming side is accompanied by ON flag in the target parameter setting table of TABLE 1. TABLE 5 is an example of a database for controlling the relationship between the user information of the incoming side (e.g., an e-mail address of the incoming side) and setting of the specific communication method.

TABLE 5

REFERENCE TABLE OF USER INFORMATION OF
THE INCOMING SIDE AND COMMUNICATION METHOD

| User Information of Incoming Side | Transmission Format | Circuit | CODEC |
|---|---|---|---|
| morinaga@flab | Real Time | LAN11 | CODEC1 |
| fukuyama@flab | Store and Forward | — | — |
| ... ... | ... ... | ... ... | ... ... |
| mazuda@flab | Real Time | LAN12 | CODEC2 |
| Default | Real Time | LAN12 | CODEC1 |

The reference table of the user information of the incoming side and the communication method of TABLE 5 includes items of the user information of the incoming side, the transmission format to be used, the circuit to be used and the CODEC to be used, and shows the relationship among the items. An e-mail address of the receiver is registered as the user information of the incoming side, for example. A transmission format (the real-time type or the store-and-forward type) to be used in accordance with each user information of the incoming side is registered as the transmission format. A LAN circuit to be used in accordance with each user information of the incoming side is registered as the circuit. A CODEC (or the compression ratio) to be used in accordance with each user information of the incoming side is registered as the CODEC. If the user information of the incoming side is accompanied by ON flag in the target parameter setting table of TABLE 1, the reference table of the user information of the incoming side and communication method of TABLE 5 is looked up, so that the transmission format, the circuit and the CODEC to be used as the communication method are decided.

TABLE 6 is a reference table of the traffic and the communication method that is looked up when the traffic is accompanied by ON flag in the target parameter setting table of TABLE 1. TABLE 6 is an example of a database for controlling the relationship between the traffic (e.g., a band used ratio) and setting of the specific communication method.

TABLE 6

REFERENCE TABLE OF THE TRAFFIC
AND COMMUNICATION METHOD

| Traffic | Transmission Format | CODEC |
|---|---|---|
| 10% | Real Time | CODEC1 |
| 20% | Real Time | — |
| ... ... | ... ... | ... ... |
| 90% | Store and Forward | CODEC2 |
| Default | Real Time | CODEC1 |

The reference table of the traffic and the communication method of TABLE 6 is prepared for each circuit to be used, includes items of the traffic, the transmission format to be used and the CODEC to be used, and shows the relationship among the items. The band used ratio of each circuit is registered as the traffic, for example. Transmission format (the real-time type or the store-and-forward type) to be used for each traffic is registered as the transmission format. A CODEC (or the compression ratio) to be used in accordance with each traffic is registered as the CODEC. If the traffic is accompanied by ON flag in the target parameter setting table of TABLE 1, the reference table of the traffic and communication method of TABLE 6 for each circuit to be used is looked up, so that the circuit, the transmission format and the CODEC to be used as the communication method are decided.

TABLE 7 is a reference table of the communication contents and the communication method that is looked up when the communication contents are accompanied by ON flag in the target parameter setting table of TABLE 1. TABLE 7 is an example of a database for controlling the relationship between the communication contents (e.g., sound or facsimile) and setting of the specific communication method.

TABLE 7

REFERENCE TABLE OF THE COMMUNICATION
CONTENTS AND COMMUNICATION METHOD

| Communication Contents | Circuit | CODEC |
|---|---|---|
| Sound | LAN11 | CODEC1 |
| Facsimile | LAN12 | CODEC2 |

The reference table of communication contents and communication method of TABLE 7 includes items of the communication contents, the circuit to be used and the CODEC to be used, and shows the relationship among the items. A communication type that is the sound or the facsimile is registered as the communication contents, for example. A LAN circuit to be used in accordance with communication contents is registered as the circuit. A CODEC (or the compression ratio) to be used in accordance with each communication contents is registered as the CODEC. The transmission format is fixed to the real-time type. If the communication contents are accompanied by ON flag in the target parameter setting table of TABLE 1, the reference table of communication contents and communication method of TABLE 7 is looked up, so that the transmission format, the circuit and the CODEC to be used as the communication method are decided.

Next, the communication process performed by the gateways GW1 and GW2 will be explained with reference to FIG. 1, in which the gateway GW1 is the calling side and the gateway GW2 is the incoming side. First, the process of the calling side gateway GW1 will be explained.

Figure 3:
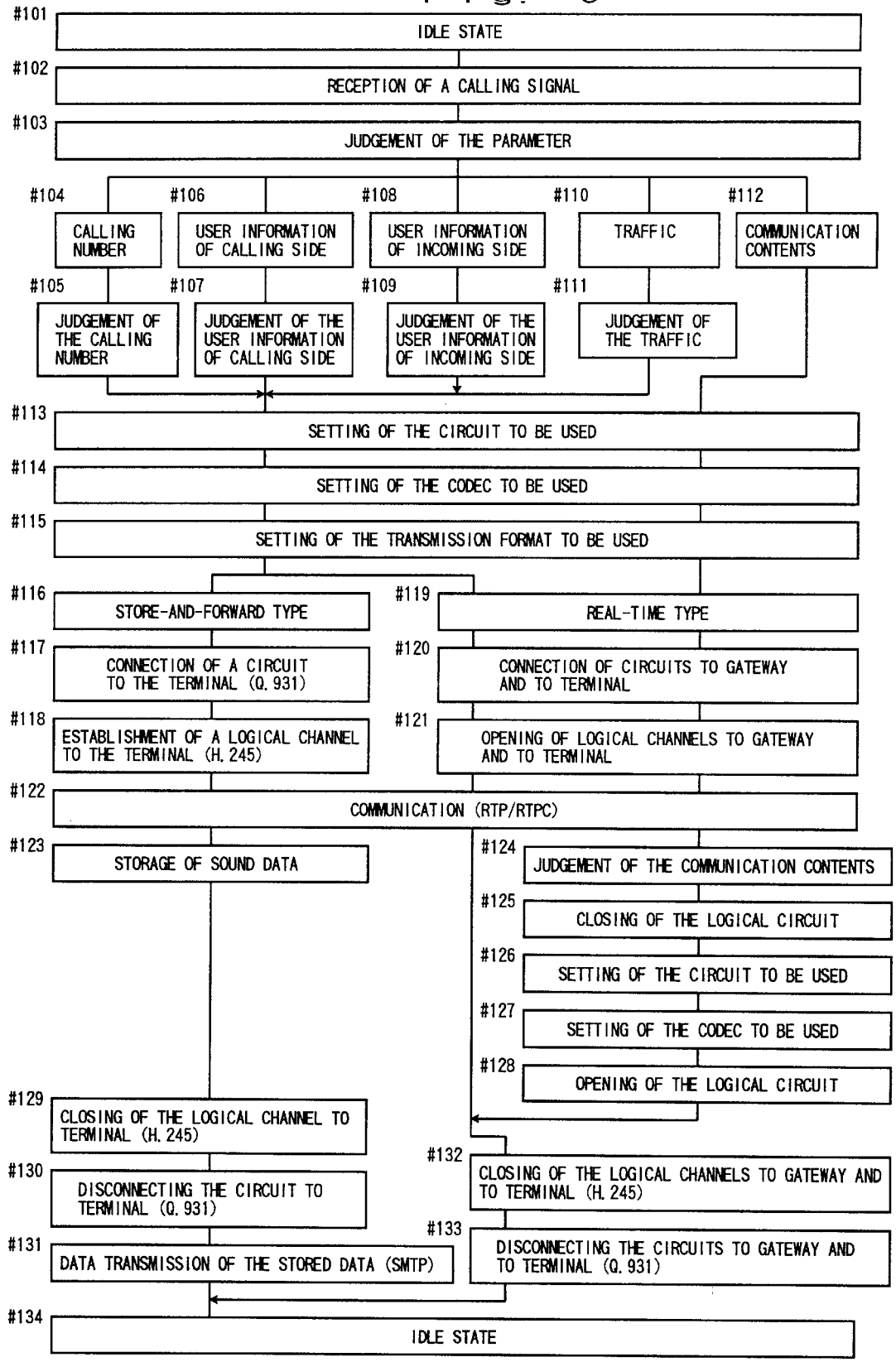
FIG. 3 is a flowchart of a process performed by the gateway of the calling side.

FIG. 3 is a flowchart of the process performed by the calling side gateway GW1. From the idle state of Step #101, the gateway GW1 receives a calling signal (Step #102), when the gateway GW1 judges the parameter (Step #103). Namely, the target parameter setting a table of TABLE 1 is looked up to as to judge which of the parameters, i.e., the calling number, the user information of the calling side, the user information of the incoming side, the traffic and the communication contents is accompanied by ON flag.

If the calling number is accompanied by ON flag (Step #104), the calling number (the telephone number) is judged (Step #105), and the circuit to be used is set (Step #113) in accordance with the reference table of the calling number and the communication method of TABLE 3. If the user information of the calling side is accompanied by ON flag (Step #106), the user information of the calling side (the telephone number of the caller) is judged (Step #107), and the circuit to be used is set (Step #113) in accordance with the reference table of the user information of the calling side and the communication method of TABLE 4.

If the user information of the incoming side is accompanied by ON flag (Step #108), the user information of the incoming side (the e-mail address of the receiver) is judged (Step #109), and the circuit to be used is set (Step #113) in accordance with the reference table of the user information of the incoming side and the communication method of TABLE 5. If the traffic is accompanied by ON flag (Step #110), the traffic (the band used ratio) is judged (Step #111), and the circuit to be used is set (Step #113) in accordance with the reference table of the traffic and the communication method of TABLE 6.

If the communication contents are accompanied by ON flag (Step #112), it is necessary to establish the communication temporarily and to judge the communication contents (i.e., sound or facsimile). Therefore, the as-is (default) status is remained until the circuit to be used is set (Step #113).

After setting the circuit to be used (Step #113), the CODEC to be used is set (Step #114), and the transmission format to be used is set (Step #115) in accordance with TABLE 3, 4, 5 or 6 or default, in the same way.

If the store-and-forward type is set as the transmission format to be used (Step #116), a circuit between the terminal and the gateway (a circuit to the terminal) is connected in accordance with Q.931 procedure (Step #117), and a logical channel between the terminal and the gateway (a logical channel to the terminal) is established in accordance with H.245 procedure (Step #118). After that, communication is performed in Step #122.

If the real-time type is set as the transmission format to be used, and the communication contents are set (with ON flag) as the parameter (Step #119), a circuit between the gateway and the opposed gateway (a circuit to gateway) as well as a circuit to terminal is connected in accordance with Q.931 procedure (Step #120). In addition, a logical channel between the gateway and the opposed gateway (a channel to gateway) as well as a channel to terminal is opened in accordance with H.245 procedure (Step #121), and then communication is performed in Step #122.

If the store-and-forward type is set as the transmission format to be used, sound data are stored (Step #123) during the communication in Step #122. Then, the logical channel to terminal is closed in accordance with the H.245 procedure (Step #129), and the logical circuit to terminal is disconnected in accordance with the Q.931 procedure (Step #130). After that, data transmission of the stored data is performed in accordance with SMTP (Step #131), and back to the idle state (Step #134).

If the real-time type is set as the transmission format to be used, after the communication in Step #122, the logical channel to gateway and the logical channel to terminal are closed in accordance with the H.245 procedure (Step #132), and the circuit to gateway and the circuit to terminal are disconnected in accordance with the Q.931 procedure (Step #133). Then, the process backs to the idle state (Step #134).

If the communication contents are set (with ON flag) as the parameter, either sound or facsimile is judged as the communication contents (Step #124) during the communication in Step #122. Then, the logical circuit to gateway is closed temporarily (Step #125), the reference table of the communication contents and communication method of TABLE 7 is looked up, and the circuit to be used is set (is changed) in accordance with the result of the communication content judgement (Step #126), and the CODEC to be used is set (is changed) (Step #127). Then, the logical circuit to gateway is opened again (Step #128), so as to establish the communication. After that, the logical channel to gateway and the logical channel to terminal are closed in accordance with the H.245 procedure (Step #132), and the circuit to gateway as well as the circuit to terminal is disconnected in accordance with the Q.931 procedure (Step #133). Then, the process backs to the idle state (Step #134).

Next, the process of the gateway GW2 of the incoming side will be explained.

Figure 4:
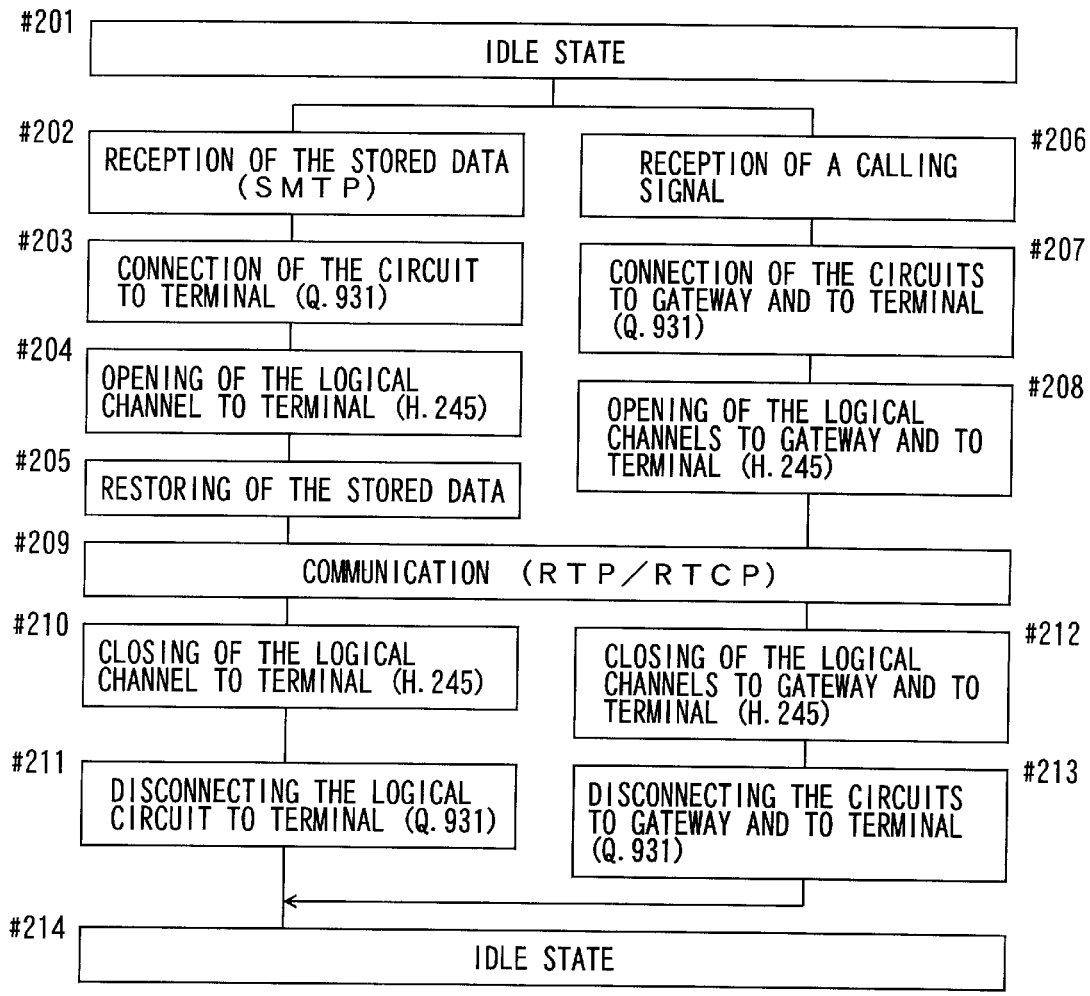
FIG. 4 is a flowchart of a process performed by the gateway of the incoming side.

FIG. 4 is a flowchart showing the process of the gateway GW2 of the incoming side. From the idle state of Step #201, the gateway GW2 receives a calling signal (Step#206), when the gateway GW2 opens a circuit between the gateway GW1 of the calling side and the circuit exchange PBX2 of the incoming side so as to perform data communication. Namely, each connection of the circuit to gateway and the circuit to terminal is performed in accordance with the Q.931 procedure (Step #207), and the logical channel to gateway as well as the logical channel to terminal is opened in accordance with the H.245 procedure (Step #208). Then the communication is performed in Step #209.

If the stored data is received in accordance with SMTP (Step #202) after the idle state of Step #201, a circuit is opened between the gateway GW2 and the circuit exchange PBX2 of the incoming side so that data communication is performed. Namely, connection to terminal is established in accordance with the Q.931 procedure (Step #203), and a channel to terminal is opened in accordance with the H.245 procedure (Step #204), so that the stored data is restored (Step #205). After that, the process backs to the communication in Step #209.

If a calling signal is received, after the communication in Step #209, the logical channel to gateway and the logical channel to terminal are closed in accordance with the H.245 procedure (Step #212), and the circuit to gateway as well as the circuit to terminal is disconnected in accordance with the Q.931 procedure (Step #213). Then, the process backs to the idle state (Step #214). If the stored data is received, after the communication in Step #209, the logical channel to terminal is closed in accordance with the H.245 procedure (Step #210), the circuit to terminal is disconnected in accordance with the Q.931 procedure (Step #211). After that, the process backs to the idle state (Step #214).

However, if the terminal is connected to the circuit exchange PBX, each H.245 procedure concerning the logical channel to terminal in Step #118, Step #121, Step #129, Step #132, Step #204, Step #208, Step #210 and Step #212 is omitted.

Figure 5:
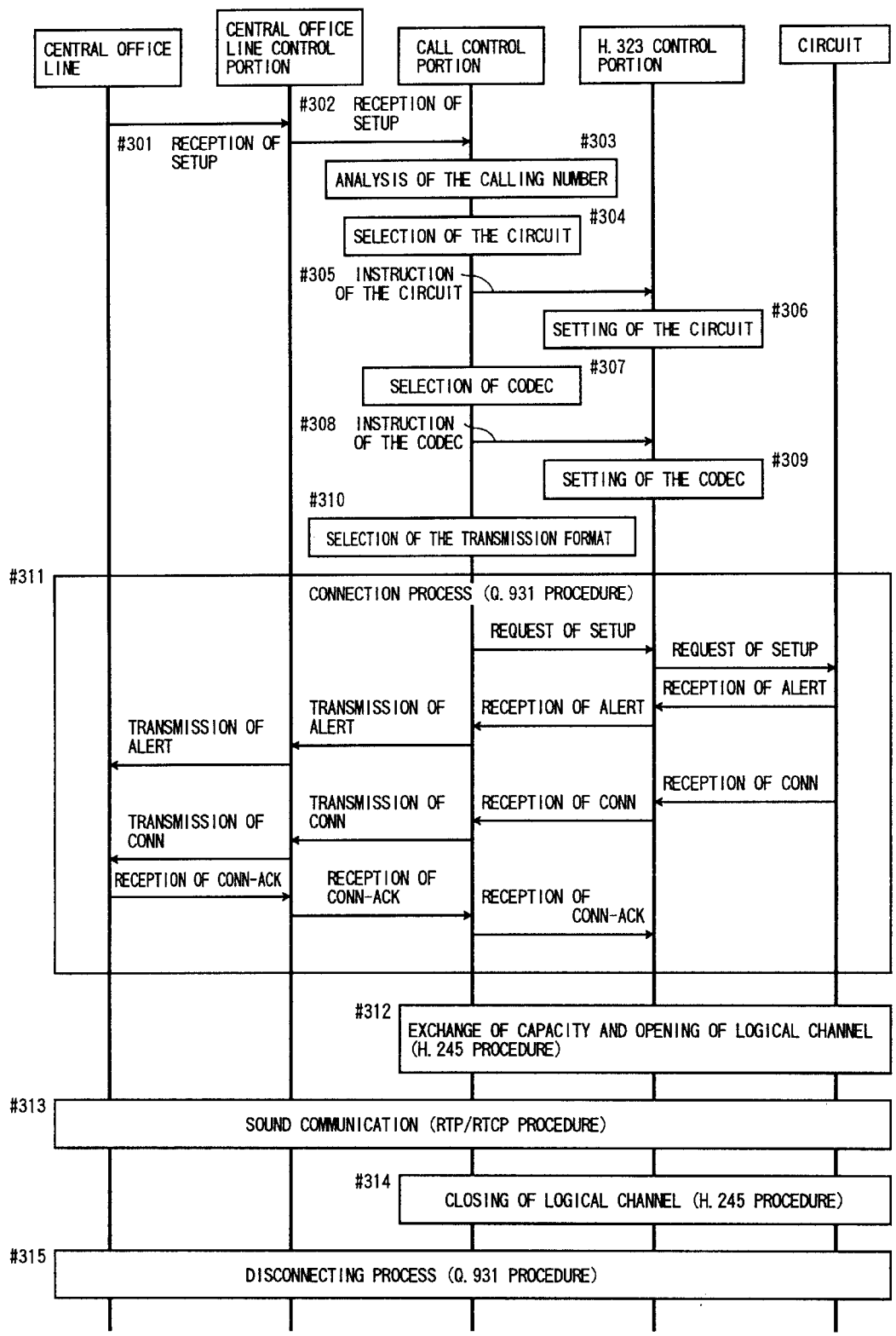
FIG. 5 is a sequence chart showing a control process performed by the gateway of the calling side, which sets the communication method using the calling number as the parameter and performs the real-time type data transmission.

FIG. 5 is a sequence chart showing the control process of real-time data transmission in the case where the gateway GW1 of the calling side sets the communication method using the calling number from the terminal 11 in accordance with the reference table of the calling number and communication method of TABLE 3. In this case, basic connection, communication and disconnecting processes of the gateway GW1 of the calling side are performed in accordance with the H.323 procedure.

In FIG. 5, when a SETUP signal of the calling signal from the circuit exchange is received by the call control portion (numeral 21 in FIG. 2) via the central office line and the central office line control portion (the central office line driver 39 and the switched circuit control portion 35 in FIG. 2) in Step #301 and Step #302, the communication method is set as follows.

The call control portion analyzes the calling number (Step #303), and looks up the communication method setting table of TABLE 2. If the circuit to be used of the communication method setting table is accompanied by ON flag, the circuit to be used is selected in accordance with the reference table of the calling number and communication method of TABLE 3 (Step #304). If the circuit to be used of the communication method setting table is accompanied by OFF flag, the default circuit is selected. The selected circuit is instructed from the call control portion to the H.323 control portion (the H.323 protocol control portion 33 in FIG. 2) in Step #305, and the H.323 control portion sets the circuit in accordance with the instruction (Step #306).

Then, the CODEC to be used of the communication method setting table is checked. If it is accompanied by ON flag, the CODEC to be used is selected in accordance with the reference table of the calling number and communication method of TABLE 3 (Step #307). If the CODEC to be used of the communication method setting table is accompanied by OFF flag, the default CODEC is selected. The selected CODEC is instructed from the call control portion to the H.323 control portion (Step #308), and the H.323 control portion sets the CODEC to be used in accordance with the instruction (Step #309).

Next, the transmission format to be used of the communication method setting table is checked. If it is accompanied by ON flag, the transmission format to be used is selected in accordance with the reference table of the calling number and communication method of TABLE 3 (Step #310). If the transmission format to be used of the communication method setting table is accompanied by OFF flag, the default transmission format to be used is selected. If the selected transmission format to be used is the real-time type, the process in the box of Step #311 is performed. This process is the usual process defined in the Q.931 procedure, so the detail explanation thereof is omitted. After that, exchange of capacity and opening of logical channel in accordance with the H.245 procedure (Step #312), sound communication by RTP/RTCP (Step #313), and closing of logical channel in accordance with the H.245 procedure (Step #314) are performed, followed by disconnecting process in accordance with the Q.931 procedure at last (Step #315). These sequential processes are based on the H.323 procedure.

Figure 6:
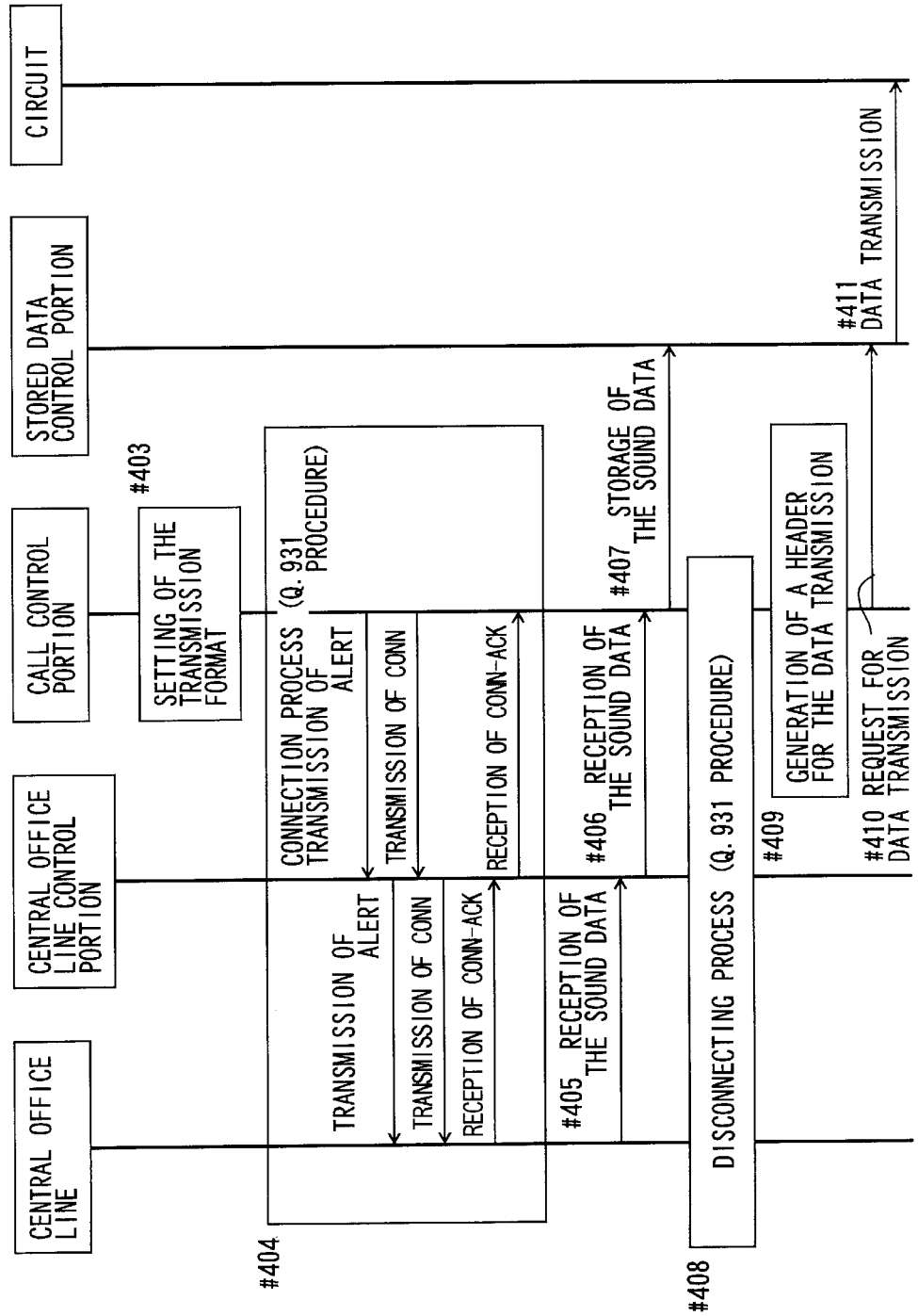
FIG. 6 is a sequence chart showing a control process performed by the gateway of the calling side, which performs the store-and-forward type data transmission.

FIG. 6 is a sequence chart showing a control process in which the gateway GW1 of the calling side performs the store-and-forward type data transmission. If the store-and-forward type transmission format is set in the transmission format selection step (Step #310) of FIG. 5, the following steps are performed in accordance with the process shown in FIG. 6.

When the transmission format is set (Step #403), the connection process in accordance with the Q.931 procedure (Step #404) is performed. Then, sound data are received by the call control portion via the central office line and the central office line control portion (Step #405 and Step #406). The received sound data are transmitted to the stored data control portion (numeral 32 in FIG. 2), and stored as an electronic file (Step #407). After finishing the communication, disconnecting process is performed in accordance with the normal Q.931 procedure (Step #408).

After the disconnecting process, a header for the data transmission including the telephone number of the incoming side is generated in the call control portion (Step #409). Request for sending data with the head is given by the call control portion to the stored data control portion (Step #410), and stored data with the header preserved as the electronic file is output in accordance with the SMTP to the circuit and toward the gateway GW2 of the incoming side (Step #411).

Figure 7:
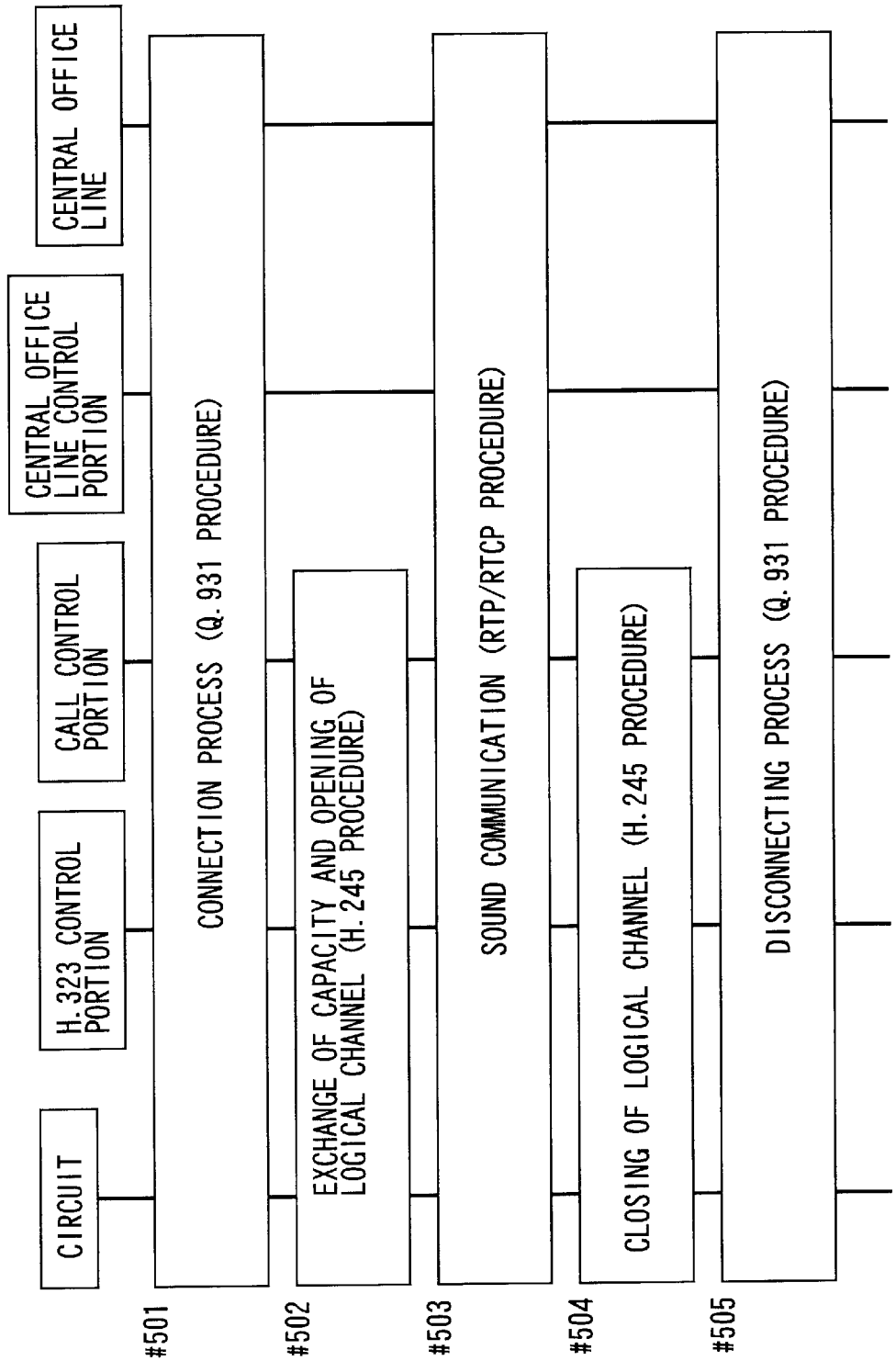
FIG. 7 is a sequence chart showing a control process performed by the gateway of the incoming side in the case where the calling number is used as the parameter for setting the communication method, and the real-time type data transmission is performed.

FIG. 7 is a sequence chart showing the process for controlling the terminal 21 of the gateway GW2 of the incoming side in the case where the gateway GW1 of the calling side sets the communication method using the calling number as the parameter, and performs the real-time type data transmission. After the connection process in accordance with the Q.931 procedure (Step #501), exchange of capacity and opening of logical channel in accordance with the H.245 procedure (Step #502), sound communication by RTP/RTCP (Step #503), and closing of logical channel in accordance with the H.245 procedure (Step #504) are performed, followed by disconnecting process in accordance with the Q.931 procedure at last (Step #505). These sequential processes are the normal process based on the H.323 procedure, performed in the same way as the latter half of the process in the gateway GW1 of the calling side Step #311~Step #315) shown in FIG. 5.

Figure 8:
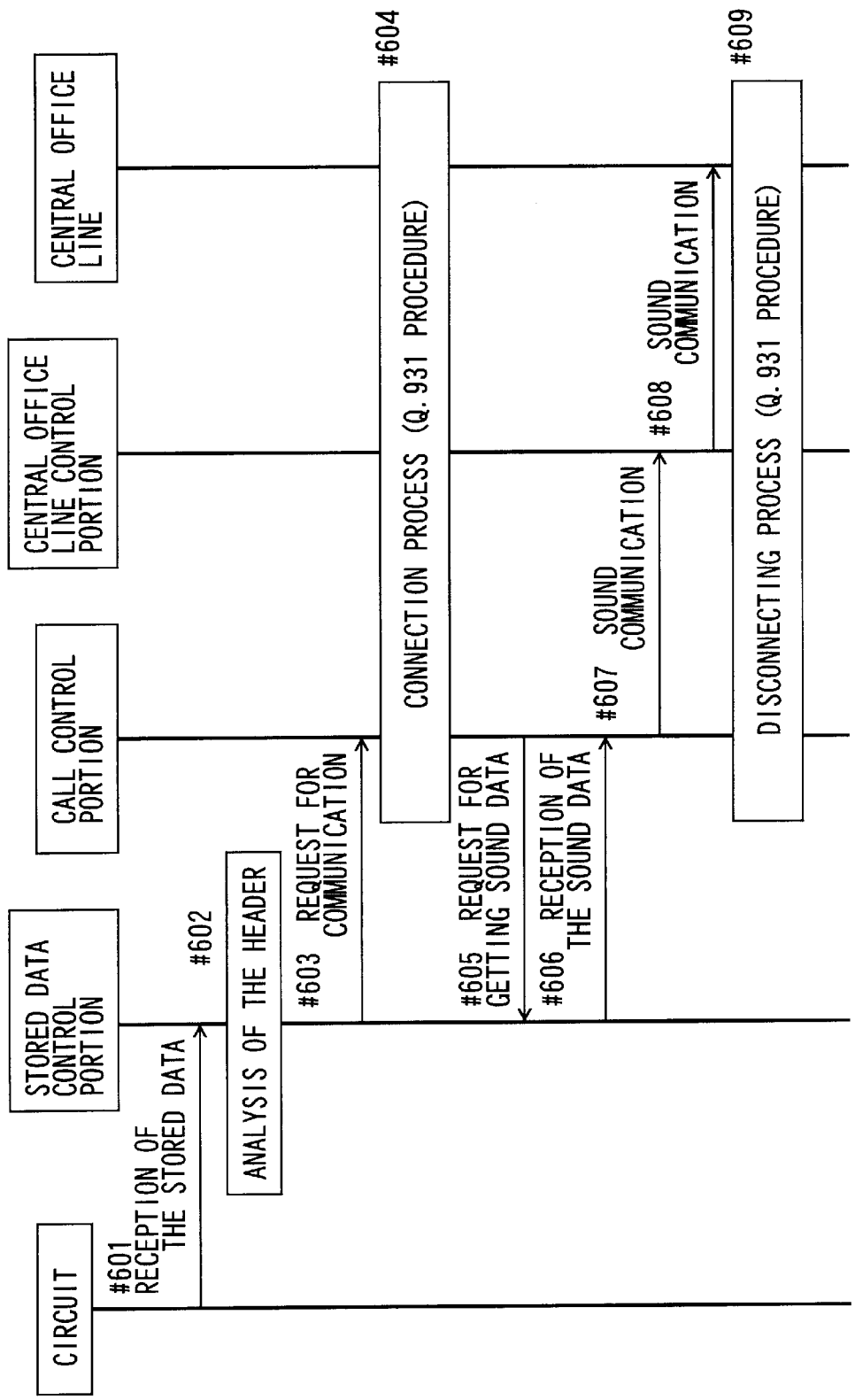
FIG. 8 is a sequence chart showing a control process performed by the gateway of the incoming side in the case where the store-and-forward type data transmission is performed.

FIG. 8 is a sequence chart showing the control process of the gateway GW2 of the incoming side in the case where the gateway GW1 of the calling side sets the communication method using the calling number as the parameter, and performs the store-and-forward type data transmission. First, the storage data processing portion receives the stored data that is an e-mail with electronic communication data converted by the SMTP (Step #601), when the storage data processing portion analyze the header of the e-mail so as to get the telephone number to receive (Step #602). Then, it sends request to communicate to the call control portion (Step #603), and performs the connection process between the gateway GW2 of the incoming side and the exchange PBX2 of the incoming side in accordance with the Q.931 procedure (Step #604). When the call is established by the connection process, and the request for getting sound data is sent from the call control portion to the storage data processing portion (Step #605), the storage data processing portion converts the communication data received as the e-mail into sound data at any time, so as to output the sound data via the call control portion and the central office line control portion to the central office line and toward the gateway GW2 of the incoming side (Step #606–#608). After finishing all transmission of the sound data, the call that was established is closed by the closing process based on the Q.931 procedure, and the communication is finished (Step #609).

As explained above, the gateway GW1 of the calling side performs the data transmission process of the real-time type or the store-and-forward type using the calling number as the parameter. The similar process is performed when the gateway GW1 of the calling side performs the transmission process of the real-time type or the store-and-forward type using the user information of the calling side that was input as the parameter. However, in this case, the user information of the calling side that was input by the telephone-equivalent terminal is given to the gateway GW1 of the calling side directly or via the circuit exchange PBX1, along with the calling signal. The gateway GW1 of the calling side compares the user information of the calling side with the reference table of the user information of the calling side and communication method shown in TABLE 4, so as to decide the circuit to be used, the CODEC to be used and the transmission format to be used.

The similar process is performed when the gateway GW1 of the calling side performs the data transmission process of the real-time type or the store-and-forward type using the user information of the incoming side that was input as the parameter. However, in this case, the gateway GW1 of the calling side first performs the data communication with the gateway GW2 of the incoming side upon receiving the calling signal, so as to get the user information of the incoming side. Then, this user information of the incoming side is compared with the reference table of the user information of the incoming side and the communication method shown in TABLE 5, so as to decide the circuit to be used, the CODEC to be used and the transmission format to be used.

The similar process is performed when the gateway GW1 of the calling side performs the data transmission process of the real-time type or the store-and-forward type using the measured traffic as the parameter. However, in this case, the gateway GW1 of the calling side gets the traffic information of each circuit via the LAN control portion (numeral 36 in FIG. 2) upon receiving the calling signal. Then, this traffic information is compared with the reference table of the traffic and communication method shown in TABLE 6, so as to decide the CODEC to be used and the transmission format to be used. In addition, concerning the circuit to be used, a circuit whose band occupying ratio during usage is low is selected.

Figure 9:
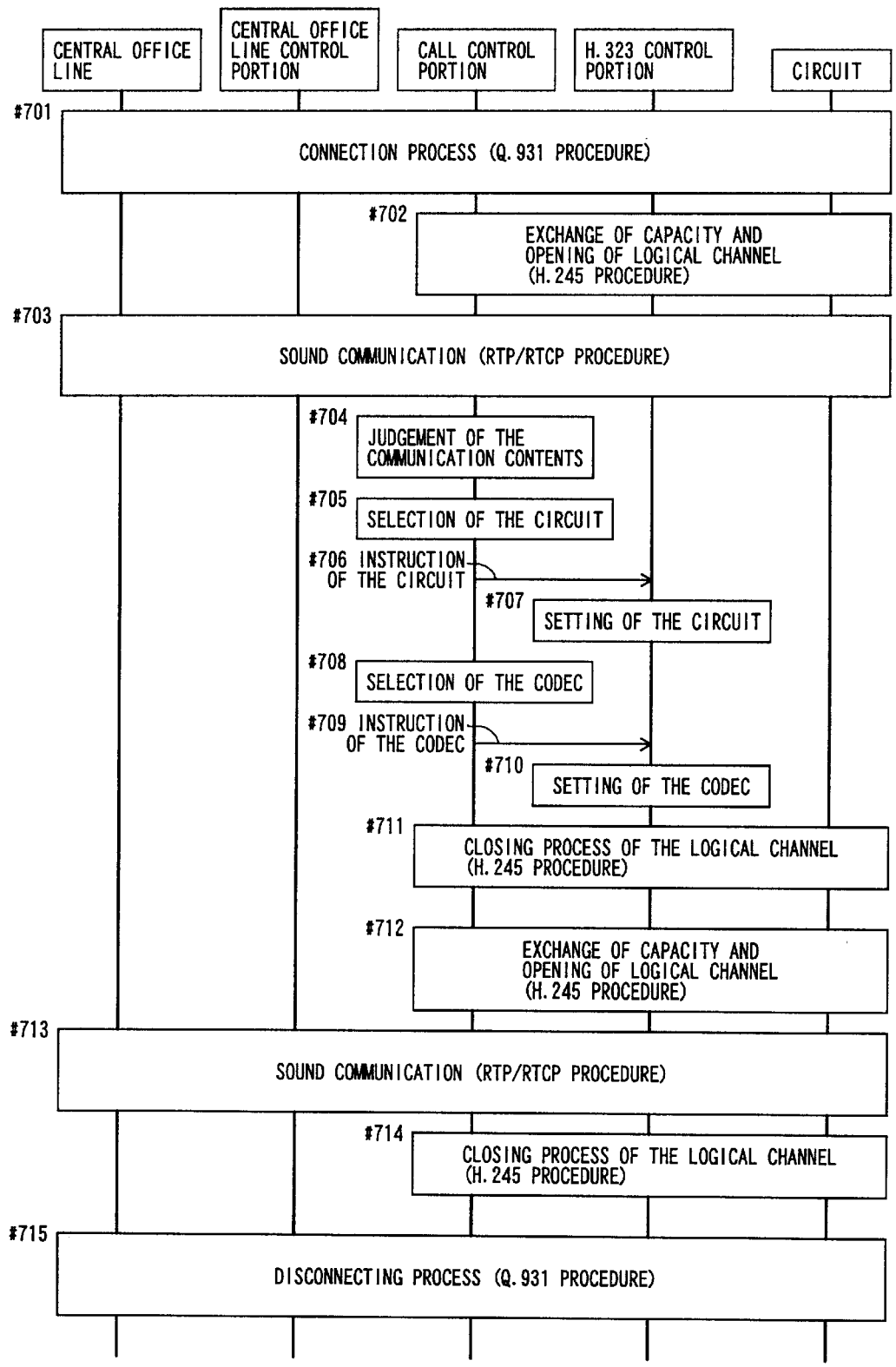
FIG. 9 is a sequence chart showing a control process in the case where the communication contents are used as the parameter for setting the communication method so as to perform the data transmission.

FIG. 9 is a sequence chart showing the control process in the case where the gateway GW1 of the calling side sets the communication method using the communication contents from the terminal 11 as the parameter, and performs the data transmission. The connection process (Step #701) in accordance with the Q.931 procedure, exchange of capacity and opening of logical channel in accordance with the H.245 procedure (Step #702), and sound communication by RTP/RTCP (Step #703) are the same as in the case mentioned above where the real-time type transmission format is selected.

In the communication control of FIG. 9, after starting the sound communication, the communication contents, e.g., the communication type, sound or facsimile is judged from the signal (Step #704). This judgement result and the reference table of the communication contents and communication method shown in TABLE 7 are compared, so that the circuit to be used is selected at first (Step #705). The selected circuit is instructed from the call control portion to the H.323 control portion (Step #706), and the H.323 control portion resets the circuit (Step #707). In addition, the call control portion selects the CODEC to be used (Step #708) in accordance with the comparison of the above-mentioned judgement result and the reference table of the communication contents and communication method. The selected CODEC is instructed to the H.323 control portion (Step #709), and the H.323 control portion resets the CODEC (Step #710).

After that, the closing process of the logical channel is performed in accordance with the H.245 procedure (Step #711), and then, using the reset circuit and CODEC, exchange of capacity and opening of logical channel in accordance with the H.245 procedure is performed (Step #712). The sound communication (Step #713), the logical channel closing process (Step #714), and the disconnecting process (Step #715) after that are the same as in the case where the above-mentioned real-time type transmission format is selected.

The above-explained communication control method is based on the complex switched network system shown in FIG. 1. However, the present invention is not limited to the complex switched network system, but can be applied to variations of the complex switched network system as follows.

First, there is a second complex switched network system that is constituted by replacing the circuit exchanges PBX1 and PBX2 in the complex switched network system shown in FIG. 1 with ATM (asynchronous transfer mode) exchanges. Thus, a complex switched network system combining the system ATM network and the Internet can be established.

In a third complex switched network system, the circuit exchanges PBX1 and PBX2 in the complex switched network system shown in FIG. 1 are removed and only terminals connected to the LAN circuit exist.

Furthermore, in a fourth complex switched network system, the gateways GW1 and GW2 of the third complex switched network system is replaced with a termination type H.323 communication terminal. Namely, the terminal 12 in FIG. 1 is connected to the router R11 directly not via the gateway GW1, and the terminal 22 is connected to the router R21 directly not via the gateway GW2.

It is clear that the communication control method and the gateway of the present invention can be used also in the second through fourth complex switched network systems mentioned above.

In addition, the calling number for specifying the party of the other side is used as the dial number to be input in the above-explained embodiment. However, the present invention is not limited to this embodiment, but can be used in various embodiments. For example, a special number added to the calling number for specifying the party of the other side (such as the number "184" used for NTT caller's number display service) can be used.

Though the telephone number of the telephone-equivalent terminal used for calling is used as the user information of the calling side in the above-explained embodiment, the present invention is not limited to this embodiment, but can be used in various embodiments. For example, an e-mail address or a title can be used as the information that can specify the user of the calling side.

In the same way, the user information of the incoming side is not limited to the e-mail address used in the above-explained embodiment, but information such as a tile or a name of the workplace can be used for specifying the user of the incoming side.

In addition, the traffic is not limited to the circuit band used ratio used in the above-explained embodiment, but can be information such as a packet discarded ratio or a packet transmit delay time.

Furthermore, the communication contents are not limited to the communication type, sound or facsimile, used in the above-explained embodiment, but can be other information such as a sound level or others that can distinguish the communication contents. It is also possible to distinguish the communication contents using a voice recognition module.

As explained above, according to the communication control method and the gateway of the present invention, the user can select the communication method, so that the communication suitable for the user's situation can be performed. If the user did not select the communication method, the gateway can select the efficient communication method automatically.

What is claimed is:

1. A method for controlling communication in a complex switched network including a packet-switched network, a circuit switched network and a gateway that is connected to the packet-switched network and the circuit switched network via at least one circuit, the method comprising:

preparing a plurality of data communication methods, each of which is a combination of method items including a data transmission format, a communication path and a data compression ratio;

preparing a parameter setting table for selecting one of parameters that can be used for selecting an appropriate data communication method among the plurality of data communication methods;

preparing a plurality of reference tables, each of which defines a relationship between parameter values and each of the method items for each parameter; and making the gateway to look up the parameter setting table and the reference table responsive to receiving a calling signal and according to the calling signal, so as to select a parameter and set each method item of the data communication method.

2. A method according to claim 1, wherein the parameter setting table includes a dial number that is input to a telephone-equivalent terminal connected to the gateway or a circuit exchange as a parameter.

3. A method according to claim 1, wherein the parameter setting table includes user information that is input to a telephone-equivalent terminal connected to a gateway or a circuit exchange of a calling side as a parameter.

4. A method according to claim 1, wherein the parameter setting table includes user information that is input to a telephone-equivalent terminal connected to a gateway or a circuit exchange of an incoming side as a parameter.

5. A Method according to claim 1, wherein the parameter setting table includes a traffic value of a packet-switched network that is measured in the gateway as a parameter.

6. A method according to claim 1, wherein the parameter setting table includes a transmission content that indicates sound or facsimile.

7. A method for controlling, with a gateway, communication in a complex network including packet-switched networks and a circuit switched network, the gateway having interfaces connecting the gateway to each of the packet-switched networks and is connected to the circuit switched network via at least one circuit, the method comprising:

preparing a plurality of data communication methods, each of which is a combination of method items including a data transmission format, a communication path and a data compression ratio, where at least two of the communication paths correspond to different respective packet switched networks;

preparing a parameter setting table for selecting one of parameters to be used for selecting an appropriate data communication method among the plurality of data communication methods;

preparing a plurality of reference tables, each corresponding to a different parameter, and each comprising values of its respective parameter, where each value identifies one of the communication methods; and making the gateway to look up the parameter setting table and the reference table when receiving a calling signal, so as to select one of the communication methods;

operating the gateway with the selected data communication method.

8. A method for controlling, with a gateway, communication in a complex network including packet-switched networks and a circuit switched network, the gateway having interfaces connecting the gateway to each of the packet-switched networks and is connected to the circuit switched network via at least one circuit, the method comprising:

preparing a plurality of data communication methods, each of which is a combination of method items including a data transmission format, a communication path and a data compression ratio, where at least two of the communication paths correspond to different of the packet switched networks;

preparing a parameter setting table for selecting one of parameters to be used for selecting an appropriate data communication method among the plurality of data communication methods;

preparing a plurality of reference tables, each corresponding to a different parameter, and each comprising values of its respective parameter, where each value identifies one of the communication methods; and making the gateway to look up the parameter setting table and the reference table when receiving a calling signal, so as to select one of the communication methods;

operating the gateway each method item of the data communication method.

9. A gateway connected to a packet-switched network and a circuit switched network so as to constitute a complex circuit network together with a circuit exchange, the gateway comprising:

a packet-switched network control portion connected to the packet-switched network, including a storage data processing portion for enabling store and forward type data transmission, a plurality of data compression means having different compression ratios for enabling real time type data transmission, a plurality of circuit connection portions that can be connected to plural circuits, and a circuit switched network control portion connected to the circuit switched network; and a call control portion for controlling a call of communication together with the packet-switched network control portion and the circuit switched network control portion, and for monitoring traffic of the packet-switched network, wherein when receiving a calling signal the gateway looks up a prepared parameter setting table and a reference table for selecting the store and forward type or the real time data transmission, selecting a communication path that uses one of the circuit connection portions, and selecting one of the data compression means.

* * * * *